(12) United States Patent
Castinado et al.

(10) Patent No.: US 10,805,234 B2
(45) Date of Patent: *Oct. 13, 2020

(54) CLOSED LOOP RESOURCE DISTRIBUTION PLATFORM ZONE GENERATION AND DEPLOYMENT

(71) Applicant: BANK OF AMERICA CORPORATION, Charlotte, NC (US)

(72) Inventors: Joseph Benjamin Castinado, North Glenn, TX (US); Charles Russell Kendall, Snoqualmie, WA (US); Andrew S. Heiman, Nashville, TN (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,317

(22) Filed: Oct. 8, 2018

(65) Prior Publication Data

US 2020/0112519 A1    Apr. 9, 2020

(51) Int. Cl.
*G06F 15/16*    (2006.01)
*H04L 12/911*    (2013.01)
(Continued)

(52) U.S. Cl.
CPC .......... *H04L 47/783* (2013.01); *G06F 9/5011* (2013.01); *G06Q 30/0238* (2013.01); *G06Q 30/0267* (2013.01); *G06Q 30/0601* (2013.01); *H04L 47/824* (2013.01); *H04L 47/828* (2013.01); *H04W 4/08* (2013.01); *G06F 2209/5011* (2013.01); *H04L 67/10* (2013.01)

(58) Field of Classification Search
CPC ... H04L 47/783; H04L 47/824; H04L 47/828; G06F 9/5011; G06Q 30/0238; G06Q 30/0267; G06Q 30/0601; G06Q 20/20; G06Q 10/087; G06Q 10/0875; H04W 4/08
USPC .......................... 709/217, 226; 235/380, 385
See application file for complete search history.

(56) References Cited

U.S. PATENT DOCUMENTS 9,135,612 B1    9/2015 Proctor, Jr. et al.
9,996,826 B2    6/2018 Levchin et al.
(Continued)

*Primary Examiner* — Emmanuel L Moise
*Assistant Examiner* — Mariegeorges A Henry
(74) *Attorney, Agent, or Firm* — Michael A. Springs; Moore & Van Allen PLLC; Jeffrey R. Gray

(57) ABSTRACT

A closed loop processing interaction network in which the resource pool source of the user and the resource pool destination are both within the same organization or group of organizations. As such, resources associated with interactions may be distributed directly between the resource pools. The interactions may occur through communication between user computer systems (e.g., mobile devices, or the like) and/or interaction terminals of product providers (e.g., mobile devices, or the like). The interaction terminals of the product providers may create and allow for the use of interaction zones, which allows for the identification of users that are a part of the interaction network, allows users to receive specialized offers, allows for direct transfer of resources within an organization that by-pass traditional resource processing. The closed loop interaction network improves the processing speeds, memory requirements, security, and costs associated with processing resources related to interactions.

19 Claims, 3 Drawing Sheets

(51) Int. Cl.
    *G06F 9/50*     (2006.01)
    *H04L 29/08*     (2006.01)
    *G06Q 30/02*     (2012.01)
    *G06Q 30/06*     (2012.01)
    *H04W 4/08*     (2009.01)

(56) References Cited

U.S. PATENT DOCUMENTS

| | | | |
|---|---|---|---|
| 2010/0280911 A1* | 11/2010 | Roberts | G06Q 20/202 |
| | | | 705/21 |
| 2012/0232981 A1 | 9/2012 | Torossian et al. | |
| 2013/0151358 A1* | 6/2013 | Ramalingam | G07G 1/12 |
| | | | 705/16 |
| 2014/0074629 A1* | 3/2014 | Rathod | G06Q 10/10 |
| | | | 705/14.73 |
| 2015/0199673 A1 | 7/2015 | Savolainen et al. | |
| 2015/0206128 A1 | 7/2015 | Torossian et al. | |
| 2015/0254639 A1 | 9/2015 | Radu | |
| 2017/0032338 A1 | 2/2017 | Szollar | |
| 2017/0116635 A1 | 4/2017 | Gantert et al. | |
| 2017/0221053 A1 | 8/2017 | Goloshchuk | |
| 2017/0243195 A1 | 8/2017 | Xing | |
| 2017/0272418 A1 | 9/2017 | Kim et al. | |
| 2017/0352034 A1 | 12/2017 | Yu | |
| 2020/0112518 A1 | 4/2020 | Castinado et al. | |
| 2020/0112519 A1 | 4/2020 | Castinado et al. | |

\* cited by examiner

CLOSED LOOP RESOURCE DISTRIBUTION PLATFORM ZONE GENERATION AND DEPLOYMENT

FIELD

The present invention relates to a closed loop resource distribution platform, and more particularly to a closed loop interaction network through which resources can be distributed in a way that improves processing speeds and reduces memory requirements.

BACKGROUND

Resource processing for interactions typically requires a chain of various systems and entities in order to provide entry points for authorization, collection of resources, movement of resources along processing rails, gateways for network communications, or the like, which all require large amounts of processing capacity and memory storage in order to allow for such resource processing, and potential return processing. It is difficult for entities, and more particularly, small entities, to build out the infrastructure to allow for such resource processing.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer implemented methods, and computer products are described herein for a resource distribution system that improves the processing speeds, memory requirements, security, and costs associated with processing resources related to interactions. In the present application, the system creates a closed loop processing interaction network, where the resource pool source of the user and the resource pool destination are both within the same organization or group of organizations. As such, the closed loop processing interaction network may be controlled by a single organization or may be controlled by multiple organizations within a multiple organization member network, either of which create an internal resource transfer processing network. As such, resources associated with interactions may be distributed directly between the resource pools of the members (e.g., the users, product providers, and/or one or more organizations) within the interaction network without having to use the traditional processing networks that have a number of issues (traditional processing networks may also be referred to herein as "traditional processing channels" or "traditional processing rails"). For example, the system described herein allows for real-time or near real-time transfer of resources without having to wait for approval of such transfers through traditional processing networks; allows for reduced storage requirements because details of each interaction and associated resource transfer do not have to be stored at each entity along the traditional processing networks; allows for improved security because details of the interaction are not touched by each entity within the traditional processing network (i.e., reduced chance of interaction or party information being compromised); allows for improved security because each party in the interaction (e.g., user and/or product provider) are more accurately identified (e.g., the organization and/or interaction network can verify the identity of each party because each party has resource pools with the one or more organizations within the interaction network); allows for improved resource transfer options because the organization has a view of both parties in the interaction, and thus can provide non-traditional resource transfer options; and reduces the costs of resource transfers because the transfer is occurring within a single organization (or groups of organizations within an interaction network) outside of the traditional processing networks.

It should be understood that user computer systems (e.g., mobile devices, or other devices as will be described herein) and/or interaction terminals of product providers (e.g., mobile devices, or other devices as will be described herein) may be utilized to allow for the interactions between members of the interaction network. For example, the interaction terminals may create and allow for the use of interaction zones, which allows for the identification of users that are a part of the interaction network, allows users to receive specialized offers, allows for direct transfer of resources within an organization (or group of organizations) in association with interactions and by-passes traditional resource processing. Moreover, the system allows product providers and users to enter into interactions within an interaction zone in order to provide resources via identification of a user computer system linked to a resource pool to complete an interaction as an alternative to physical resources or traditional processing networks.

Embodiments of the invention comprise a closed loop resource distribution and interaction zone system, computer implemented method, and computer program product for increasing efficiency of processing interactions. Embodiments of the invention comprise identifying that a user has entered an interaction zone, wherein the interaction zone is formed by one or more interaction terminals of one or more product providers. Embodiments of the invention further comprise determining when the user is interested in an interaction with a product provider based on an action associated with a user computer system of the user or an interaction terminal of the product provider, and determining interaction information to present to the user based on the interaction in which the user is interested. Embodiments further comprise determining when the user belongs to an interaction network with the one or more product providers, and receiving confirmation from the user or the product provider to enter into the interaction through the user computer system or the interaction terminal. Embodiments further comprise identifying resources to transfer associated with the interaction between a user resource pool and a product provider resource pool, and transferring the resources from the user resource pool to the product provider resource pool of the product provider.

In further accord with embodiments of the invention, the interaction zone is established by the one or more interaction terminals at a location of the product provider.

In other embodiments of the invention, the interaction zone is a wireless zone through which the user connects using the user computer system to enter into the interaction with the one or more interaction terminals.

In still other embodiments of the invention, identifying that the user is a member of the interaction network comprises identifying that the user has the user resource pool with one of one or more of the organizations within the interaction network.

In yet other embodiments of the invention, identifying that the user is a member of the interaction network comprises identifying that an identifier assigned to the user or the user computer system meets one of a plurality of identifiers for the interaction network.

In further accord with embodiments of the invention, identifying that the user is a member of the interaction network comprises identifying that the user computer system of the user is logged into an interaction network application.

In other embodiments of the invention, identifying that the user is interested in the interaction with the product provider based on the action associated with the user computer system comprises the user capturing an interaction identifier from marketing materials or a product using the user computer system.

In yet other embodiments of the invention, identifying that the user is interested in the interaction with the product provider based on the action associated with the user computer system comprises the user communicating with the one or more interaction terminals using the user computer system.

In still other embodiments of the invention, identifying that the user is interested in the interaction with the product provider based on the action associated with the user computer system comprises a user confirmation of an offer sent by the one or more interaction terminals to the user computer system through the interaction zone.

In further accord with embodiments of the invention, the one or more interaction terminals are one or more point of sale devices, one or more mobile devices of the product provider; and wherein the user computer system is a mobile device.

In other embodiments, the invention further comprises establishing an interaction network for users and product providers, wherein establishing the interaction network comprises identifying the users and the product providers that have resource pools with one or more organizations within the interaction network. Thereafter, sending notifications to the users and products providers to join the interaction network, and grouping the users and the product providers as members of the interaction network as the users and the product providers join the interaction network.

In still other embodiments of the invention, the interaction network allows for transferring the resources directly between one or more organizations within the interaction network without using traditional resource networks.

In yet other embodiments of the invention, the user computer system is a user mobile device and the interaction terminal of the product provider is a product provider mobile device, and wherein the interaction occurs through interaction network applications located on the user mobile device and the product provider mobile device.

In further accord with embodiments, the invention further comprises identifying when the user is a non-member of the interaction network, and providing the interaction information comprises product information from the product provider and a benefit for becoming a member of the interaction network.

In other embodiments of the invention, receiving confirmation from the user to enter into the interaction comprises the user joining the interaction network before entering into the interaction through the user computer system.

In still other embodiments, the invention further comprises identifying when the user is a non-member of the interaction network, and processing the interaction through traditional processing interactions when the user is the non-member of the interaction network.

In yet other embodiments of the invention, providing the interaction information comprises providing an offer for a product at a discount over a traditional interaction that occurs outside of the interaction network.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
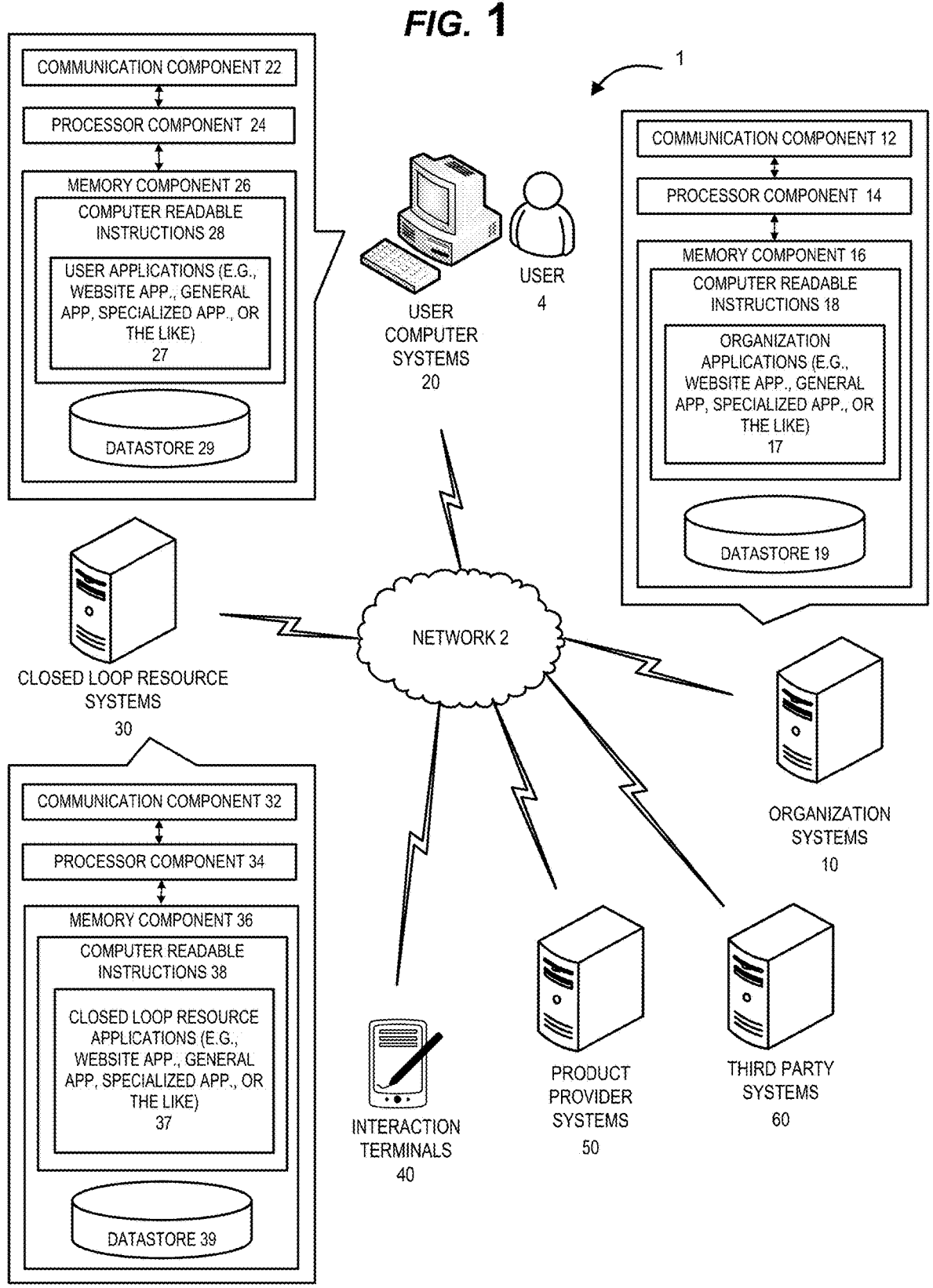

Having thus described embodiments of the invention in general terms, reference will now be made to the accompanying drawings, and wherein:

FIG. 1 illustrates a block diagram of a resource distribution platform system environment, in accordance with one or more embodiments of the invention.

Figure 2:
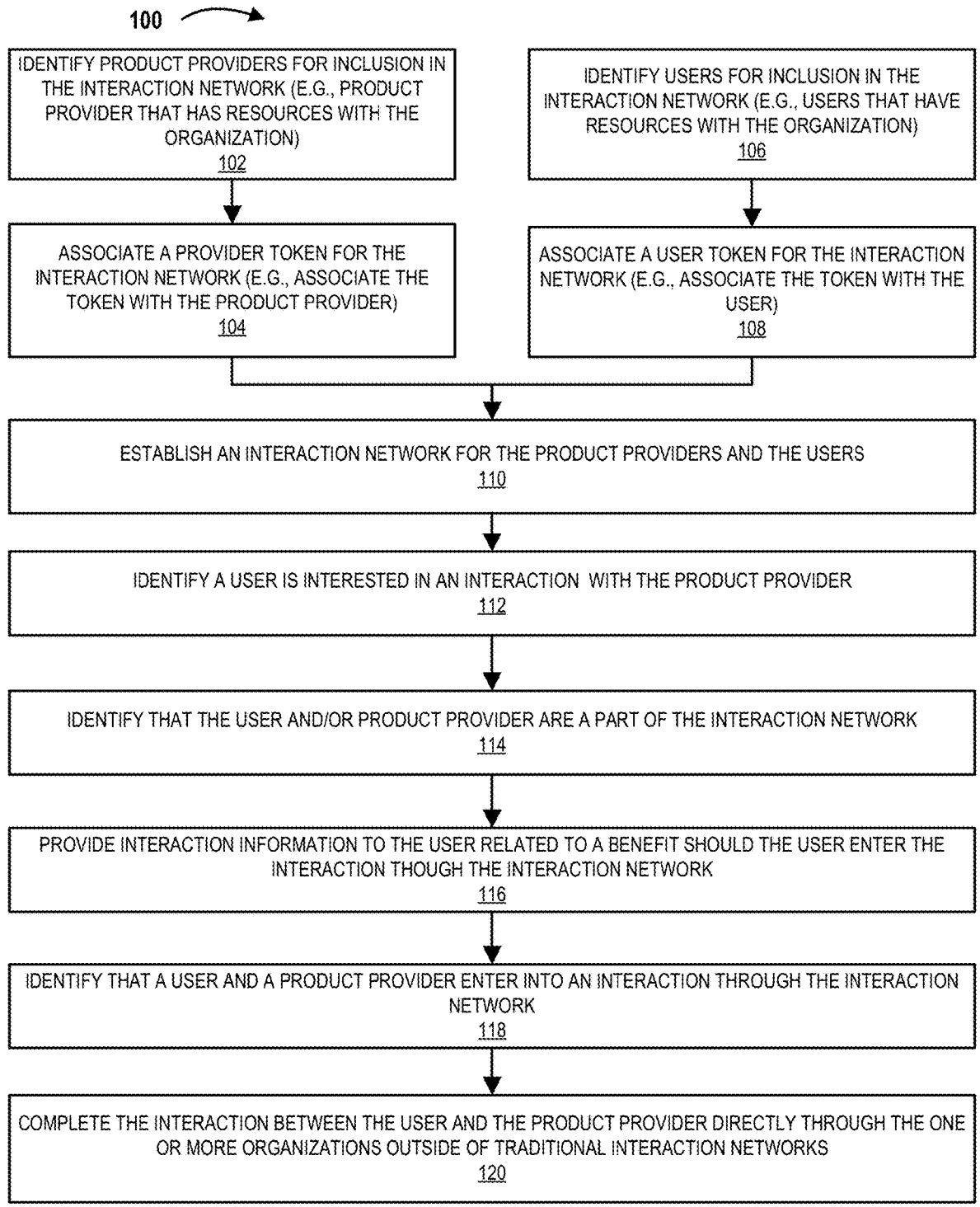

FIG. 2 illustrates a closed loop resource distribution process, in accordance with one or more embodiments of the invention.

Figure 3:
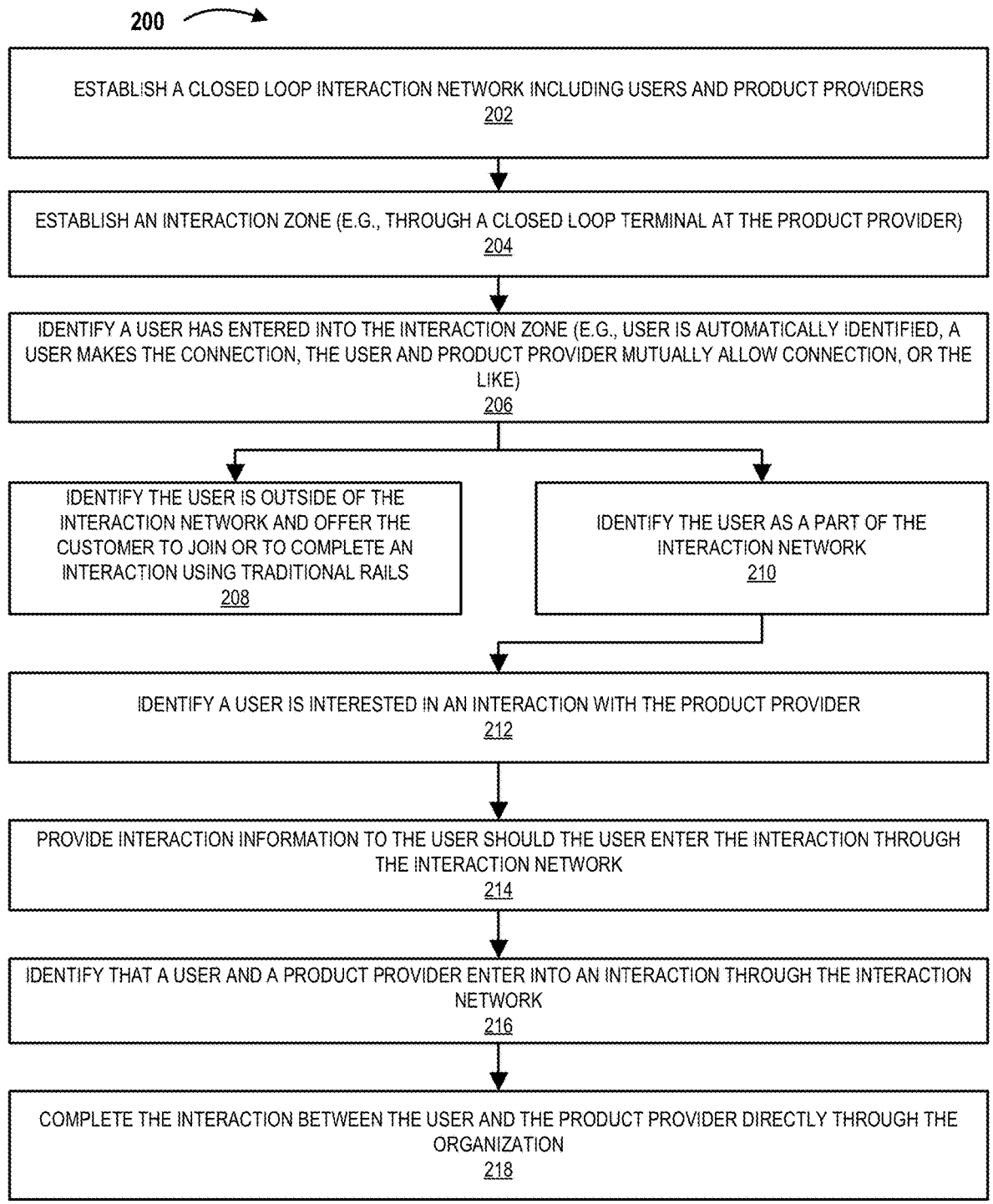

FIG. 3 illustrates a closed loop interaction zone resource distribution process, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Systems, methods, and computer program products are herein disclosed for a resource distribution system that improves the processing speeds, memory storage, security, and reduces costs associated with processing resources related to interactions. In the present application, the system creates a closed loop processing interaction network, wherein the resource pool source of the user and the resource pool destination are both within the same organization or group of organizations. As such, the closed loop processing interaction network may be controlled by a single organization or may include a multiple organization member network, which forms an internal resource transfer processing network. As such, resources associated with interactions may be distributed directly between the resource pools of the members within the interaction network without having to use the traditional processing networks that have a number of issues. For example, the system described herein allows for real-time or near real-time transfer of resources without having to wait for approval of such transfers through traditional processing networks; allows for reduced storage requirements because the details of each interaction and associated resource transfer do not have to be stored at each entity along the traditional processing networks; allows for improved security because details of the interaction are not touched by each entity within the traditional processing network; allows for improved security because the organization or groups of organizations have insight into the identities of the parties engaged in the interaction; allows for improved resource transfer options because the organization has a view of both parties in the interaction, and thus can provide non-traditional resource transfer options; and reduces the costs of resource transfers because the transfer is occurring within a single organization outside of the traditional processing networks.

It should be understood that user computer systems (e.g., mobile devices) and/or interaction terminals of product providers may be utilized to allow for the interactions between members of the interaction network. For example, the interaction terminals may create and allow for the use of interaction zones, which allows for the identification of users that are a part of the interaction network, allows users to receive specialized offers, allows for direct transfer of resources within an organization in association with interactions, and allows for by-passing traditional resource processing. As such, the system allows product providers and users to enter into interactions within an interaction zone in order to provide resources via identification of a user computer system linked to a resource pool to complete an interaction as an alternative to physical resources or traditional processing.

FIG. 1 illustrates a resource distribution platform system environment 1, in accordance with embodiments of the invention. As illustrated in FIG. 1, one or more organization systems 10 are operatively coupled, via a network 2, to one or more user computer systems 20, one or more closed loop resource systems 30, one or more interaction terminals 40, one or more product provider systems 50, and/or one or more third party systems 60.

In this way, the one or more organization systems 10 may be the systems that run the applications that the organization uses within the organization's operations (e.g., that store and process interactions using resources from resource pools). The users 4 (e.g., one or more associates, employees, agents, contractors, sub-contractors, third-party representatives, customers, or the like), may include customers, employees of the product providers, employees of the organization, or the like. The users 4 may use the user computer systems 20 to communicate with the other systems and devices (e.g., interaction terminals 40) and/or components thereof. The one or more closed loop resource systems 30 may be utilized to allow the users 4 to enter into closed loop interactions with the one or more product provider systems 50 through the one or more organization systems 10. The interaction terminals 40 may facilitate the interactions between the users 4 and the product provider systems 50, such as through the use of an interaction zone through which the users 4 and/or the product providers may communicate, and/or through mobile devices, point of interaction devices, or other systems, as will be described herein in further detail. The third-party systems 60 may act as an intermediary between the various systems and/or may be other organizations that that belong to the interaction network, which will be described in further detail herein.

As such, the users 4 (e.g., customers, or the like) may use the resources that the users 4 have with the organization to enter into interactions with the product providers, which may also have resources with the same organization (or different organizations within the same interaction network). As such, the one or more user computer systems 20 may communicate with the one or more product provider systems 50 directly and/or through the closed loop resource systems 30, through one or more organization systems 10, and/or through third party systems 60 such that the interactions between the users 4, the organizations, and/or the product providers are completed more efficiently, timely, cost-effectively, and/or with reduced memory and processing speed requirements, as will be discussed in further detail herein.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more closed loop resource systems 30, the one or more interaction terminals 40, the one or more product provider systems 50, the one or more third party systems 60, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more closed loop resource systems 30 and closed loop resource applications 37, the one or more interaction terminals 40 (and applications thereof), the product provider systems 50 (and applications thereof), the third party systems 60 (and applications thereof), and/or other systems (not illustrated). It should be understood that the one or more organization applications 17 may comprise the applications that are used by the organization to control, monitor, deliver, transfer, or the like, the resources of its customers (e.g., users and/or product provider systems, or the like).

As further illustrated in FIG. 1, the one or more user computer systems 20 are operatively coupled, via a network 2, to the one or more organization systems 10, the one or more closed loop resource systems 30, the one or more interaction terminals 40, the one or more product provider systems 50, and/or the one or more third party systems 60. As illustrated in FIG. 1, users 4 may use the one or more closed loop resource systems 30 and/or the one or more organization systems 10 to enter into interactions with one or more product provider systems 50 through the use of the interaction terminals 40, as will be described in further detail herein with respect to FIGS. 2 and 3.

It should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more closed loop resource systems 30, the one or more interaction terminals 40, the one or more product provider systems 50, the one or more third party systems 60, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to perform the actions described herein (e.g., transfer resources through the interaction terminals 40, closed loop resource systems 30, or the like).

As illustrated in FIG. 1, the one or more closed loop resource systems 30 are operatively coupled, via a network 2, to the one or more organization systems 10, the one or more user computer systems 20, the one or more interaction terminals 40, the one or more product provider systems 50, the one or more third party systems 60, and/or the other systems. The one or more closed loop resource systems 30, as will be described in further detail herein, may be utilized to facilitate closed loop resource interactions between users 4 and product providers through the one or more organization systems 10 directly with each other (instead of through traditional networks) that are more efficient, and thus, more cost effective, as will be discussed herein. It should be understood that the one or more closed loop resource systems 30 may be a part of, and thus controlled by the organization, the product provider, or may be a part of a third party system. As such, the one or more closed loop resource systems 30 may be supported by a third-party and/or by the organization.

The close loop resource systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more interaction terminals 40, the one or more product provider systems 50, the one or more third party systems 60, and/or the other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more closed loop resource systems 30 may have computer-readable instructions 38 stored in the one or more memory components 36, which in some embodiments includes the computer-readable instructions 38 of one or more closed loop resource applications 37 that allow the users 4 and product providers to enter into interactions using the user computer systems 20 and the interaction terminals 40 through the one or more organization systems 10 (or the one or more third party systems 60), as will be described herein.

Moreover, the one or more interaction terminals 40, the one or more product provider systems 50, the one or more third party systems 60, and/or other systems may be operatively coupled to and communicate with the one or more organization systems 10, the one or more user computer systems 20, and/or the one or more closed loop resource systems 30, through the network 2. The one or more interaction terminals 40, the one or more product provider systems 50, the one or more third party systems 60, and the one or more other systems may have the same or similar components as the one or more organization systems 10, the one or more user computer systems 20, and/or the one or more closed loop resource systems 30 (e.g., communication component, processor component, memory component—computer readable instructions for applications, datastore), and/or each other in the same or similar way as previously described with respect to the one or more organization systems 10, the one or more user computer systems 20, and/or the one or more closed loop resource systems 30.

It should be understood that the one or more interaction terminals 40 may comprise any type of device or component thereof, such as a desktop, mobile device (e.g., laptop, smartphone device, PDA, tablet, watch, wearable device, or other mobile device), server, wireless device, geo-fenced device, beacon, or any other type of system hardware, through which an interaction may occur. Moreover, it should be understood that the one or more interaction terminals 40 may be point of interaction devices (e.g., point of sale devices, or the like). As such, it should be understood that the one or more interaction terminals 40 may facilitate the closed loop resource interactions, traditional resource interactions, or combinations thereof to allow for interactions between the users 4, product providers, and/or organizations. It should be understood that in some embodiments the one or more interaction terminals 40 may be owned and/or provided by the organization (or the interaction network—combinations of organizations). In some embodiments, the one or more interaction terminals 40 may be able to create an interaction zone (e.g., through a wired, wireless, or like component interaction) through which the interactions can occur between users 4, product providers, and the organization, as will be discussed in further detail herein.

The one or more product provider systems 50 may comprise the systems that a product provider uses to enter into interactions with user 4. For example, the product provider may be a merchant that provides a product (e.g., goods or services) to users during an interaction, and collects resources through the one or more organization systems 10. It should be understood that both the user 4 and the product provider may have resource pools (e.g., accounts, or the like) with the organization, and as such, a closed loop interaction network may be created between the users 4, product providers, and/or one or more organizations (e.g., at which the users 4 and product providers have resource pools). Consequently, the closed loop interaction network may allow for the real-time (e.g., real-time or near real-time) transfer of resources in response to an interaction without having to use traditional processing networks (e.g., processing channels through multiple entities, or the like) that are used for the transfer of resources. Traditional processing may include processing interactions through multiple entities, such as one or more entities that provide gateways for accessing the traditional processing networks, one or more entities for clearing houses, one or more entities for exchanges, one or more entities for common language processing, one or more entities for credit card processors, one or more entities for holding resources until the interaction is completed, or other like entities. The present invention by-passes these traditional processing networks, and thus, the present closed loop system has improved processing speeds, reduced memory requirements for interactions (e.g., interaction details do not need to be stored with each entity along each processing network), improved efficiency (e.g., multiple systems and entities are cut of the interactions), improved security (e.g., much fewer entities touch—have access to—the interaction data, and the parties in the interaction are known parties by the organization and/or organizations) and/or reduced costs due to elimination of processing through entities through the traditional processing networks.

The third party systems 60 may be systems of other organizations that may be part of the interaction network through which the closed loop interactions may occur. For example, these may include the other organizations (e.g., resource organizations, or the like) that hold other resource pools of the users 4 and/or product providers.

It should be understood that traditionally, product providers (e.g., merchants, or the like) set up an arrangement with an interaction processor that is an entry point into the channels for authorizing the transfer of resources, the collection of resources, and the movement of resources into product provider resource pools when users enter into interactions with the product providers. Furthermore, in some instances there is an additional resource transfer gateway process for e-commerce interactions. The resource transfer gateway ensures that the collection of information (e.g., resource pool information, user information, or the like) is in compliance with regulatory and security mechanisms. The channels do not allow for simple encryption and storage, so many smaller product providers employ third parties to handle developing the components and processes needed to enter the interactions (i.e., instead of trying to develop and build out such systems internally).

It should be further understood that interactions and the associated resource transfers described herein may include "on-us" and "off-us" interactions. On-us interactions include interactions that only involve a single organization, such that resource transfers occur within the single organization (e.g., transferring resources between two different resource pools of a single user within a single institution, or transferring resources between resource pools of a first user and a product provider within the same organization, or the like). Alternatively off-us interactions require other organizations to be involved (e.g., a second financial institution, other entities within the processing networks) in order to transfer resources between two resource pools at two different organizations. With respect to on-us interactions between users and product providers that both have resource pools with the same organization, the present invention allows these types of interactions to proceed without having to use the traditional processing networks.

As such, in the present application, the system creates a closed loop processing network, where the resource pool source of the user and the resource pool destination are both within the same organization. Furthermore, the closed loop systems may include other organization network partners to create a membership network with multiple organizations to create an "on-we" (similar to on-us except there may be multiple organizations) resource transfer processing network.

Moreover, it should be understood that current resource transfer technology currently uses Internet based network processing to allow small sized product providers that typically operate using physical resources (e.g., food trucks, family owned stores, farmers market, or the like) to accept other forms of resource transfers (e.g., credit cards, debit cards, or the like). In some embodiments of the invention, the systems, and in particular, the interaction terminal 40 at the one or more product providers may create an interaction zone (e.g., zone in which users may be identified and/or transfer resources, or the like), which allows a customer to transfer resources in association with interactions. As such, the system allows the product providers and users 4 to enter into interactions to provide resources via identification of a user computer system 20 at the interaction zone (e.g., identified via bluetooth, NFC, beacon, or the like through the interaction terminal 40) linked to a resource pool to complete an interaction as an alternative to physical resources (e.g., cash, negotiable instrument, or the like). To identify the user 4, the system may recognize the user 4 as being associated with the interaction network and provide the user 4 with the ability to enter an interaction through the interaction zone. The system may also present specialized offers for the product through the use of the interaction network, including the interaction zone. The system may further provide interaction terminals 40 at the product providers to provide the ability to enter interactions with users 4 through the use of the user computer system 20 and/or interaction terminals 40 without additional equipment with which the user 4 has to interact (e.g., dongle, touchscreen, or the like attached to a mobile device of the product provider).

In this way, the present system creates an ecosystem for e-commerce through a payment gateway, connecting interaction terminals 40, and creating a back-end closed loop interaction network (e.g., for members) for expedited interaction processing including resource transfers (e.g., product provider receives funds in real-time or near real-time) without the necessity or lag time involved in traditional resource transfers along traditional channels.

The present system provides and alternative interaction terminal 40 and/or application therefor, for product providers and/or users 4, which increases the speed of the resource transfers, reduces the capacity needed to allow for the interactions, reduces the costs associated with traditional processing (e.g., cuts out the traditional entities through which the current resource transfers occur). For example, using an on-us or on-we, or other closed network system, the system may allow a user 4 to use the interaction network for resource transfers in order to prevent the costs and other issues associated with traditional processing networks.

FIG. 2 illustrates a process flow for a closed loop resource distribution process, in accordance with some embodiments of the invention. As illustrated by block 102 of FIG. 2, the system identifies product providers for inclusion in the interaction network. For example, this may include identifying product providers (e.g., merchants, such as large businesses, small businesses, individuals, or the like) that have resource pools (e.g., accounts, or the like) with the organization (e.g., financial institution) or with one of the member organizations within the interaction network. In some embodiments of the invention the organization (or member organization) may solicit its client product providers in order to join the interaction network. The benefits to product providers for joining the interaction network include allowing interactions between the product providers and users (e.g., customers) to occur more quickly than traditional processing (e.g., instantaneously in real-time or near real-time), as well as greatly reducing the costs because of the reduced storage of interaction information (e.g., traditional processing rails and infrastructure are not needed, a number interaction details do not need to be stored along the traditional processing rails, or the like), and reduced costs from the various third-party entities along the traditional processing rails that are omitted.

Moreover, block 104 of FIG. 2 further illustrates that provider tokens (otherwise described as an identifier) may be assigned to the product provider identified as having resource pools with the organization (or a member organization). The tokens may provide a way to identify the product provider and/or product provider information of the product provider. For example, one or more tokens may be used to identify product provider information for a product provider that indicates the interaction terminals 40 associated with the product provider, the resource pools the product provider has with one or more organizations within the interaction network, and/or other information associated with the product provider. As such, in some embodiments, the token may be associated with one or more of the interaction terminals 40 to identify the product provider that is entering an interaction with a user 4. As such, in some embodiments, the token may be identified with a particular mobile device or application thereof that the product provider is using to enter interactions with users 4. Alternatively, or additionally, the token may be associated with a resource pool that the product provider has with an organization within the interaction network. The token may be any type of indicator (e.g., number, characters, symbols, emojis, pictures, drawings, or the like) that is use as an identifier. In some embodiments, the token could be a resource pool number of the product provider's resource pool.

Block 106 of FIG. 2 further illustrates that the system identifies users 4 for inclusion in the interaction network. For example, this may include identifying the users (e.g., individual customers of the organization) that have resource pools (e.g., accounts, or the like) with the one or more organizations (e.g., financial institution, or the like). The users 4 may be current customers, or may be potential customers that are sent notifications in order to join the interaction network, as will be discussed in further detail herein (e.g., sending random notifications to join the interaction network, making a suggestion to join the interaction before the user enters an interaction through the network, or the like). Moreover, like block 104, the system may assign tokens to the users 4, as illustrated by block 108. The tokens may comprise a way to identify the users 4. For example, one or more tokens may be used to identify user information for one or more users 4. The user information may include the user computer systems 20 associated with the users 4, the mobile wallets associated with the users 4, the resource pools the users 4 have with one or more organizations within the interaction network, and/or other information associated with the users 4. As such, in some embodiments, the token may be an identifier associated with one or more of the user computer systems 20, such as a way to identify the user 4 that is entering an interaction with a product provider. As such, in some embodiments, the token may be identified with a particular mobile device or application thereof that the user 4 is using to enter interactions with the product provider. Alternatively, or additionally, the token may be associated with a resource pool that the user 4 has with an organization within the interaction network. The token may be any type of indicator (e.g., number, characters, symbols, emojis, pictures, drawings, or the like) that is use as an identifier. In some embodiments, the token could be a resource pool number of the user's resource pool.

FIG. 2 further illustrates in block 110 that the system establishes the interaction network (e.g., before or after identifying the product providers and/or users 4). The interaction network may include a network of the users 4 and product providers that have resource pools with the one or more organizations within the interaction network. It should be understood that the interaction network may be established in a number of different ways, including but not limited to, utilizing current interaction terminals 40 (e.g., smartphones, laptops, desktops, or other systems) through which the interaction network may be established and/or connected to, providing general interaction terminals 40 to product providers that are able to handle both dedicated interactions through the interaction network, as well as interactions through traditional networks (e.g., current resource processing for interactions), providing a dedicated interaction terminal 40 that is specific to interactions through the interaction network (e.g., dedicated point-of-interaction device, interaction zone device, mobile device application, or the like through which interactions may only be completed through the interaction network), or combinations thereof.

As such, it should be understood that in some embodiments product providers may enter into interactions with users 4 through Internet enabled interaction terminals 40, such as a smart phones, desktop computers, or the like. In this way, the interaction network may be based on an Internet application accessed through mobile devices, desktops, or other user computer systems 20. For example, a web-based application or a dedicated application accessed through a system, such as a mobile device, may be created through which a user 4 may enter into an interaction with a product provider, if the user and product provider have resource pools with the one or more organizations within the interaction network. As such, instead of the integration occurring through traditional networks (e.g., traditional processing rails, such clearing housings, exchanges, common language processing, credit card processors, or the like), the interaction and/or resource transfer may occur directly within the one or more organizations within the interaction network for which both the user and product provider have resource pools. The interaction may occur through an app, online banking application, or interaction network application that both the user 4 and the product provider may access.

Alternatively, in some embodiments the product provider may have one or more interaction terminals 40 that may comprise point-of-interaction devices, such as a card reader, mobile device reader, touchscreen device, near field communication reader, RFID reader, or any other type of point-of-interaction device, or the like. It should be understood that such an interaction terminal 40 may already be utilized by the product provider to enter into interactions with users 4 utilizing traditional processing networks. It should be understood that such current interaction terminals 40 may be updated with applications that allow the interaction terminals 40 to be utilized for both traditional processing along traditional processing rails, or for closed looped interactions over the interaction network discussed herein. For example, the traditional interaction terminals 40 may be updated with software that allows for the determination that a user 4 has a user resource pool with the same organization (or otherwise with an organization that belongs to an interaction network of multiple organizations) that the product provider has a product provider resource pool, and as such, the closed loop interaction may occur for this particular interaction.

In still other embodiments of the invention, as will be described in further detail with respect to FIG. 3, the organization my create a specialized interaction terminal 40 and provide these devices to the product providers. The specialized interaction terminal 40 may include any type of dedicated interaction terminal 40 that allows for interactions on the interaction network outside of traditional networks, and in some embodiments, may also allow for transactions over traditional channels when the users 4 do not have resource pools with the same organization or interaction network as the product provider. Moreover, the specialized interaction terminal 40 may create an interaction zone through which the user 4 may be identified and/or enter into interactions with the product provider through the interaction zone, as will be described in further detail with respect to FIG. 3.

It should be understood that the interaction network may be created in order to allow the product providers and/or the user 4 to enter into interactions anywhere. As such, the product providers may use stationary interaction terminals 40 at stationary locations. Otherwise, the interaction terminals 40 may be mobile interaction terminals 40 that allow the product providers, such as mobile product providers, to set up for interactions using the interaction terminals 40 (e.g., using interaction zones, or the like) in any location (e.g., festivals, farmers markets, food trucks, or the like).

Once the interaction network is established, the system may identify a user 4 that is interested in an interaction with the product provider, as illustrated by block 112 of FIG. 2. It should be understood that the identification of the interest of a user 4 in an interaction may occur in any number of ways. For example, at the location of the product provider, or otherwise over an Internet connection, the user 4 may take an action with the user computer system 20 that may indicate that the user is interested in an interaction with the product provider. In one embodiment of the invention, as will be described in further detail with respect to FIG. 3, the user 4 may enter an interaction zone (e.g., area defined by a connection with an interaction terminal 40 of the product provider, such as wireless network, near-field communication, interaction terminal communication zone, geo-fenced area, or the like). As such, the user computer system 20 may automatically connect (or may require the user to agree to connect) to the interaction terminal 40 of the product provider (e.g., interaction zone beacon, wireless network, mobile hot spot, or other like interaction terminal 40 or portion thereof). In this way, the user and product provider may enter into an interaction in which resources are transferred through the use of the interaction zone.

In other embodiments, the user action may include allowing the user computer system 20, such as a mobile device, to capture information (e.g., scan, take a photo, communicate with an RFID tag, capture a unique barcode, capture infrared information, or the like) from a product or material (e.g., marketing materials, brochures, signs, product labels, or the like). In some embodiments this may include capturing information from an interaction identifier (e.g., any picture, code, character, string of characters, or the like) located on the product or product material, or capture information based on the product itself (e.g., image of the product, or the like). For example, in some embodiments the product provider may list a resource amount for a product using traditional processing channels, and a discounted resource amount (or other offer) should the user enter the interaction through the interaction network. It should be understood that the product provider may be able to make such offers (e.g., discounts, add-ons, special transfer options, or the like) due to the increased savings associated with transferring resources over the closed loop system (e.g., due to reduced interaction information storage requirements, reduced third-party entities that are required to achieve the traditional processing, or the like).

In other embodiments, identifying that the user is interested in a interaction with the product provider may be the user information (e.g., wish list), interaction history (e.g., previous interactions with the product provider or other product providers), and/or the location of the user 4 with respect to product providers (e.g., based on location determining device in the user computer system 20).

Regardless of how the potential interaction is identified, in response to identifying that a user 4 is interested in an interaction with a product provider, the system may identify that the user 4 and/or product provider are a part of the interaction network. This determination may be made in order to identify if the user 4 satisfies requirements for particular offers, as will be described in block 116. In order to determine if the user 4 and/or the product provider are members of the interaction networks, the user computer systems 20, the interaction terminals 40, and/or the product provider systems 50 may communicate with the closed loop resource systems 30 and/or the organization systems 10 information that is captured from the user and/or product provider (or the systems associated with each) in order to determine if the user 4 and the product provider are part of the interaction network (e.g., have resource pools at the same institution or with member organizations). For example, the tokens associated with the user computer system 20 and the product provider (e.g., through the interaction terminal 40) can be used to determine if the user and product provider are a part of the interaction network (e.g., compare the captured tokens to the stored token values, the user information of the user and/or product provider information of the product provider, and/or the resource pools associated with the user and product provider). However, it should be understood that any method of authenticating the user and/or the product provider may be used in order to determine if the parties are part of the interaction network.

It should be understood that the system may already automatically have verified that the product provider is a part of the interaction network due to the fact that the interaction terminals 40 are registered with the system (e.g., closed loop resource systems) as being a part of the interaction network. For example, the interaction terminals 40 may include the applications that allow for the closed loop interactions over the interaction network (e.g., as well as traditional interaction processing), moreover, in some embodiments the interaction terminals 40 may be provided by the organization, and thus, the organization already knows what product providers are part of the interaction network. As such, in some embodiments, the system may only have to authenticate and/or identify that the user 4 is a member of the interaction network. It should be understood that in some embodiments the identification of the user 4 may be tied to the user computer system 20, application on the user computer system 20, or the like. For example, the user 4 may have resource pools at many institutions, and as such, the user 4 may be using a resource pool (e.g., a digital wallet, resource pool, or the like) from a non-affiliated organization that is outside of the interaction network for the interaction, and thus, the system may not be able to identify that the user 4 is part of the interaction network. As such, the identification of the user 4 as member of the interaction network may be required to be made through the identification of the use of the user computer system 20 and not a resource transfer instrument (e.g., credit or debit card, electronic resource transfer pool, or the like) that is affiliated with a non-member organization. In some embodiments, it should be understood that this step in the process may occur before or after the user 4 and the product provider enter into an interaction.

Block 116 of FIG. 2 illustrates that interaction information may be presented to the user 4 after the user is identified as having an interest in an interaction with the product provider, as described with respect to block 112, and/or the user 4 and/or product provider are part of the interaction network, as described with respect to block 114. For example, after the user is identified as being interested in an interaction with the product provider (e.g., the user is at the location of the product provider—through the interaction zone, the user scanned information about a product, or the like) than the product provider systems 50, the interaction terminals 40, the closed loop resource systems 30, and/or the organization systems 10 may provide potential offers to the users 4 on the user computer systems 20. For example, information about potential products may be presented to the users 4 on the user computer systems 20. More particularly, the offers may include information regarding the products for users 4 that are in the interaction network versus users 4 that are not in the interaction network. For example, since resource transfers that occur through the interaction network can be made directly through the resource pools at the organization (or another member organization), the costs associated with using traditional resource processing networks is avoided. As such, the product information may include a discount for the product, add-on products, future offers, special resource transfer options (e.g., paying using a checking account, savings account, line of credit, or the like), or the like should the interaction be made through the resource network. Moreover, the resource network may be able to quickly identify the resources that the user 4 has available immediately, and as such, the user 4 may be approved for an interaction immediately without having to wait for approval through traditional processing networks (e.g., the user may be extended credit based on resource pool information of the user, or the like). Furthermore, resources can be transferred in real-time because the resources pools of both entities are located with the same organization or member organization. As such, there are no costs or additional resource transfers required for settlement and positing of resources, because the resources can be transferred instantaneously within the organization (or within member organizations) because additional third-parties are not involved in the interactions.

Other product information may also be presented to the users 4 on the user computer systems 20. For example, when the system determines that the user 4 is not a part of the interaction network, the system may provide a notification to allow the user 4 to join the interaction network in order to achieve benefits associated with entering the interaction through the interaction network. For example, the organization may send a notification to allow the user 4 to open a resource pool (e.g., checking, savings, credit line, or other like resource pool) with the organization in order to be able to take advantage of the benefits associated with interactions that occur over the interaction network.

Block 118 of FIG. 2 further illustrates that the system identifies that the user 4 and the product provider have entered into an interaction through the interaction network. For example, once the user 4 authorizes a transfer of resources to the product provider, the user computer systems 20, the closed loop resource systems 30, interaction terminals 40, and/or the product provider systems 50 will communicate with the organization systems 10 in order to determine that the user 4 has the resources for the interaction. It should be understood, as previously described above, when the user 4 and/or product provider may have already been identified as being a part of the interaction network before entering the interaction, then the one or more systems simply determine if the user 4 has the resources in the one or more resource pools of the user 4 to enter into the interaction. Alternatively, after determining that the user 4 has entered into an interaction with the product provider, if the system has not yet determined if the user 4 and/or the product provider are a part of the interaction network, the system may identify if the user and/or product provider are part of the interaction network, as previously described with respect to block 114. As such, before the interaction is completed, the system may illustrate to the user 4 the offer associated with the product if the user completes the interaction through the interaction network. For example, the system may notify the user 4 through the user computer system 20, or the interaction terminal 40, of the benefits of entering the interaction through the interaction network (e.g., illustrating the discount to the user for the product). In some embodiments, the user 4 may try to enter an interaction using resources from a resource pools that is outside of the interaction network (e.g., an out of interaction network resource pool), and the system may notify the user 4 that should he/she enter the interaction through the interaction network the user 4 would receive one or more benefits.

In some embodiments, it should be understood that the user 4 and product provider may enter into the interaction through a user mobile device and a product provider mobile device. As previously described, a user 4 may be identified as interested in a product of the product provider by taking an action with the user's mobile device (e.g., scanning something, entering an interaction zone, or the like), which may automatically open an interaction network application on the user's mobile device (e.g., dedicated app, online banking application, or the like). The application on the user's mobile device may communicate with a corresponding application on the product provider's mobile device in order to enter into the interaction. As such, it should be understood that an interaction network application (or portion thereof) on both the user's mobile device and the product provider's mobile device may only be accessed if the both are members of the interaction network. As such, in some embodiments of the present invention, the interaction may occur between the user 4 and the product provider without having to use additional dongles (e.g., accessories to the mobiles devices such as card readers, or the like) and over a closed loop interaction network that provides improved technical features that result in reduced costs and/or additional benefits to both the users 4 and the product providers.

As illustrated in Block 120 of FIG. 2, after the interaction is completed between the user 4 and the product provider through the user computer system 20, the closed loop resource system 30, the interaction terminal 40, and/or the product provider systems 50, the organization system 10 will complete the interaction by transferring resources from the user resource pool to the product provider resource pool. As described herein the resource transfer occurs directly between the user resource pool and the product prover resource pool automatically without having to be processed through the traditional processing channels. In some embodiments of the invention, it should be understood that before the interaction is completed the product provider and/or the organization may provide the user 4 resource transfer options, such as a request for the resource pool from which resources should be transferred to the product provider resource pool. For example, the product provider and/or the organization may allow the user 4 to transfer resource through the use of a checking, savings, investment, line of credit, or the like resource pool of the user 4. In other examples, the organization may also request to which product provider resource pool the resources of the user are to be transferred.

As such, in the invention described with respect to FIG. 2, the system may utilize the closed loop interaction network to increase processing speeds (e.g., real-time or near real time transfer), reduce memory storage requirements for the interactions (e.g., when compared to traditional processing memory requirements), improve security because the interaction occurs within a single organization instead of transferring information through multiple third-party entities (e.g., each transfer of information is a potential point of a security issue), reduced potential misappropriation because both resource pools are located at the same organization (i.e., the organization has a more accurate understanding of the identity of the parties), more flexibility in resource transfers because the organization has more information about the user 4 and product provider (e.g., can extend same as cash transfers, credit lines, HELOC, micro-funding, or like based on relationships with the users 4 and/or the product providers). All of these benefits reduce the cost associated with an interaction, and thus, the product provider and/or the organization can provide additional offers to the user 4 and/or the product provider.

FIG. 3 illustrates a closed loop interaction zone resource distribution process, in accordance with one or more embodiments of the invention. As illustrated by block 202 in FIG. 3, a closed loop interaction network is established including users 4, product providers, and one or more organizations (e.g., a single organization or multiple organizations within the same interaction network in which resources may be freely transferred). The creation of the interaction network may be completed in the same or similar way as illustrated and described with respect to blocks 102 to 110 of FIG. 2. Specifically, the closed loop interaction network may be formed through the use of one or more interaction terminals 40 that are provided to the product providers in order to allow users 4 to connect with the interaction network in order to enter interactions with product providers. In some embodiments, the one or more interaction terminals 40 may be a standalone point-of-interaction devices that allow users 4 to communicate with product providers in order to enter into interactions. In other embodiments of the invention, the one or more interaction terminals 40 may be accessory devices (e.g., interaction zone beacons, or the like) that work with other interaction terminals 40 of the product providers (e.g., a mobile device, or the like).

Block 204 illustrates that the one or more interaction terminals 40 establish an interaction zone, through which a user 4 may be identified and/or enter into an interaction with a product provider. It should be understood that the interaction zone may comprise any way that the one or more interaction terminals 40 may create a definite or scaled zone for a product provider through which a user 4 can be identified (e.g., by connecting to, or otherwise communicating with) in order to enter into interactions with the user 4. In one example, the interaction zone may be formed through a wireless network that is created by a point of interaction device or a router that communicates with the point of interaction device (or a mobile device) of the product provider. As such, when a user computer system 20 associated with the user 4 is in range of the interaction zone, the wireless network communicates with the user computer system 20 and/or the interaction terminal 40 in order to identify the presence of the user 4. In other examples, the interaction zone may be formed by a geo-fenced location (e.g., wired area), which when crossed by a user computer system 20 communicates with the user computer system 20 and/or the interaction terminal in order to identify the presence of the user 4. In another embodiment of the invention, the interaction zone may be an RFID, near-field communication device, interaction network beacons, or the like that is used to detect the presence of a user computer systems 20 of a user 4. In other embodiments of the invention, the interaction zone may be determined by triangulated wireless communication devices, global positing tracking of a user computer system 20, or other like tracking of the location of a user computer system 20 that comes within a defined range of the product provider (e.g., a mobile and/or stationary product provider).

Regardless of how the interaction zone is created by the one or more interaction terminals 40, as illustrated in block 206, the system may identify when a user 4 has entered into the interaction zone. For example, a user 4 may be automatically identified when the user computer system 20 of the user communicates with and/or is identified as being present by the interaction zone (e.g., by the one or more interaction terminals 40, product provider system 50, and/or the closed loop resources systems 30). The user 4 may be identified in some embodiments as previously described with respect to block 112 of FIG. 2 which discusses determining that a user 4 is interested in an interaction with a product provider. As such, an identifier associated with the user computer system 20 (e.g., a token, or other type of identifier) may be determined automatically (e.g., associated with the device itself, an application on the device, or the like), or the user 4 may be required to open an application, activate the application, scan and/or capture information from a product or material, and/or take another action in order to allow the interaction zone to identify the user 4 through the user computer system 20.

Blocks 208 and 210 of FIG. 3 illustrate that after identifying the user (or failing to identify the user) is in the interaction zone, the system may determine if the user belongs to the interaction network. Determining if the user belongs to the interaction network may occur as previously described with respect to block 114 of FIG. 2. As illustrated by block 208 of FIG. 3, the system may determine that the user 4 in the interaction zone does not belong to the interaction network. As such, the system may not take any action, and thus, should the user enter into the interaction with the product provider, the interaction would occur through the traditional processing networks. In some embodiments of the invention, when the user 4 is identified as being a non-member of the interaction network, a notification may be presented to the user 4 (on the user computer system 20, on the interaction terminal 40, or the like) in order to allow the user 4 to join the interaction network by opening a resource pool with a member organization of the interaction network. Block 210 of FIG. 3 illustrates that the system may identify that the user is a member of the interaction network, as previously discussed with respect to block 114 of FIG. 2, and thus, allow the user 4 to access the interaction network to enter an interaction, as described in further detail below.

Block 212 of FIG. 3 illustrates that after the user 4 is identified as a member of the interaction network, the system identifies that the user 4 has an interest in an interaction with the product provider. This is done in the same way as described with respect to block 112 of FIG. 2. For example, the user 4 may capture information using the user computer system 20 (e.g., scanning a product or materials), making a selection of products that are presented to the user on the user computer system 20 (e.g., list of products made available to the user through an interaction network application), or the like.

Moreover, as illustrated by block 214 the system provides interaction information to the user 4 regarding the interaction in which the user 4 is interested, as previously described with respect to block 116 of FIG. 2. For example, the information may include other offers available to the user 4 by making the interaction through the interaction network, the benefits to the user 4 by using the interaction network (e.g., savings versus traditional processing), resource pool options for the user 4 entering the interaction (e.g., resource transfer, credit line availability, HELOC, micro-funding, no interest for a period of time, or the like).

Furthermore, as illustrated by block 216, the system identifies that the user 4 and the product provider entered into an interaction through the interaction network, as previously discussed with respect to block 118 of FIG. 2. That is, the user 4 may select a product for the interaction and verify himself/herself in order to enter into the interaction with the product provider for the product. It should be understood, as previously described herein, that entering the interaction may occur directly through the communication of the user computer system 20 with the interaction terminal 40 of the product provider (e.g., direct wireless communication between two mobile devices and/or associated applications, communication of the user mobile device with the interaction terminal 40, or the like) without having to use a physical card associated with the user 4 and/or a dongle associated with the interaction terminal 40 of the product provider.

Finally, as illustrated by block 218, the system completes the interaction between the user 4 and the product provider directly through the organization, as previously discussed with respect to block 120 of FIG. 2.

It should be understood that the present invention can be used for any users 4 (e.g., customers) and any product providers (e.g., merchants). However, it should be understood that the interaction network may be especially beneficial for small businesses, cash businesses, and/or groups of small businesses. Small businesses do not have the resources to build out the systems and applications for in-person and/or e-commerce interactions between the users 4 and the small businesses. As such, small businesses typically have to contract with and/or interact with multiple third parties to complete the interactions with users, which increases the time it takes to complete resource transfers associated with interactions (e.g., may take days for resource transfers to clear), increases the costs for the small businesses (e.g., payments have to be made to each of the third parties along the traditional processing rails), and requires storage of the interaction and resource transfer details along the various processing entities, which increases the amount of memory storage for each interaction. Unlike traditional processing, the present invention provides a closed loop system that does not require the businesses to contract with and/or interact with multiple third parties to complete the interactions with users 4, which decreases the time it takes to complete resource transfers (e.g., may occur in real-time or near-real time), decreases the costs for the small businesses (e.g., payments occur directly between accounts at the same institution outside of traditional processing rails), reduces storage requirements because the interactions and resource transfer details only need to be stored at the organization that holds the resource pools, and/or improves security because the organization has a relationship with each party (e.g., users have user resource pools and product providers have product provider pools with the same organization). As such, the present invention provides improvements over traditional interaction systems.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/154,309 | CLOSED LOOP RESOURCE DISTRIBUTION PLATFORM | Concurrently herewith |
| 16/154,114 | CLOSED LOOP PLATFORM FOR DYNAMIC CURRENCY CONVERSION | Concurrently herewith |

What is claimed is:

1. A closed loop resource distribution and interaction zone system for increasing efficiency of processing interactions, the system comprising:
   one or more memory components having computer readable code stored thereon; and
   one or more processing components operatively coupled to the one or more memory components, wherein the one or more processing components are configured to execute the computer readable code to:
   identify that a user has entered an interaction zone, wherein the interaction zone is formed by one or more interaction terminals of one or more product providers;
   determine when the user is interested in an interaction with a product provider based on an action taken within the interaction zone by the user with a user computer system of the user or an interaction terminal of the product provider;
   determine interaction information to present to the user based on the interaction in which the user is interested;
   determine when the user is a member of an interaction network with the one or more product providers, wherein determining that the user is the member of the interaction network comprises identifying that the user has a user resource pool with one of one or more of the organizations within the interaction network, wherein the one or more organizations are one or more financial institutions, and wherein the interaction network comprises users and product providers that all have resource pools with the one or more financial institutions;
   receive confirmation from the user or the product provider to enter into the interaction through the user computer system or the interaction terminal;
   identify resources to transfer associated with the interaction between the user resource pool and a product provider resource pool; and
   transfer the resources from the user resource pool to the product provider resource pool of the product provider directly between the user resource pool and the product provider resource pool when the user is the member, and indirectly along traditional processing rails outside of the interaction network when the user is identified as a non-member.

2. The system of claim 1, wherein the interaction zone is established by the one or more interaction terminals at a location of the product provider.

3. The system of claim 2, wherein the interaction zone is a wireless zone through which the user connects using the user computer system to enter into the interaction with the one or more interaction terminals.

4. The system of claim 1, wherein identifying that the user has the user resource pool with the one of the one or more organizations comprises identifying that an identifier assigned to the user or the user computer system meets one of a plurality of identifiers for the interaction network.

5. The system of claim 1, wherein identifying that the user has the user resource pool with the one of the one or more organizations comprises identifying that the user computer system of the user is logged into an interaction network application.

6. The system of claim 1, wherein identifying that the user is interested in the interaction with the product provider based on the action associated with the user computer system comprises the user capturing an interaction identifier from marketing materials or a product using the user computer system.

7. The system of claim 1, wherein identifying that the user is interested in the interaction with the product provider based on the action associated with the user computer system comprises the user communicating with the one or more interaction terminals using the user computer system.

8. The system of claim 1, wherein identifying that the user is interested in the interaction with the product provider based on the action associated with the user computer system comprises a user confirmation of an offer sent by the one or more interaction terminals to the user computer system through the interaction zone.

9. The system of claim 1, wherein the one or more interaction terminals are one or more point of sale devices, one or more mobile devices of the product provider; and wherein the user computer system is a mobile device.

10. The system of claim 1, wherein the one or more processing components are configured to execute the computer readable code to:
    establish the interaction network for the users and the product providers, wherein establishing the interaction network comprises identifying the users and the product providers that have resource pools with the one or more organizations within the interaction network;
    sending notifications to the users and the products providers to join the interaction network; and
    grouping the users and the product providers as members of the interaction network as the users and the product providers join the interaction network.

11. The system of claim 1, wherein the interaction network allows for transferring the resources directly between the one or more organizations within the interaction network without using traditional resource networks.

12. The system of claim 1, wherein the user computer system is a user mobile device and the interaction terminal of the product provider is a product provider mobile device, and wherein the interaction occurs through interaction network applications located on the user mobile device and the product provider mobile device.

13. The system of claim 1, wherein the one or more processing components are further configured to execute the computer readable code to:
    identify when the user is the non-member of the interaction network; and
    wherein providing the interaction information comprises providing product information from the product provider and a benefit for becoming the member of the interaction network.

14. The system of claim 13, wherein receiving confirmation from the user to enter into the interaction comprises the user joining the interaction network before entering into the interaction through the user computer system.

15. The system of claim 1, wherein providing the interaction information comprises providing an offer for a product at a discount over a traditional interaction that occurs outside of the interaction network.

16. A computer implemented method for a closed loop resource distribution and interaction zone system for increasing efficiency of processing interactions, the method comprising:
- identifying, by one or more processor components, that a user has entered an interaction zone, wherein the interaction zone is formed by one or more interaction terminals of one or more product providers;
- determining, by the one or more processor components, when the user is interested in an interaction with a product provider based on an action taken within the interaction zone by the user with a user computer system of the user or an interaction terminal of the product provider;
- determining, by the one or more processor components, interaction information to present to the user based on the interaction in which the user is interested;
- determining, by the one or more processor components, when the user is a member of an interaction network with the one or more product providers, wherein determining that the user is the member of the interaction network comprises identifying that the user has a user resource pool with one of one or more of the organizations within the interaction network, wherein the one or more organizations are one or more financial institutions, and wherein the interaction network comprises users and product providers that all have resource pools with the one or more financial institutions;
- receiving, by the one or more processor components, confirmation from the user or the product provider to enter into the interaction through the user computer system or the interaction terminal;
- identifying, by the one or more processor components, resources to transfer associated with the interaction between the user resource pool and a product provider resource pool; and
- transferring, by the one or more processor components, the resources from the user resource pool to the product provider resource pool of the product provider directly between the user resource pool and the product provider resource pool when the user is the member, and indirectly along traditional processing rails outside of the interaction network when the user is identified as a non-member.

17. The computer implemented method of claim 16, wherein the interaction zone is established by the one or more interaction terminals at a location of the product provider.

18. A computer program product for a closed loop resource distribution and interaction zone system for increasing efficiency of processing interactions, the computer program product comprising at least one non-transitory computer-readable medium having computer-readable program code portions embodied therein, the computer-readable program code portions comprising:
- an executable portion configured to identify that a user has entered an interaction zone, wherein the interaction zone is formed by one or more interaction terminals of one or more product providers;
- an executable portion configured to determine when the user is interested in an interaction with a product provider based on an action taken within the interaction zone by the user with a user computer system of the user or an interaction terminal of the product provider;
- an executable portion configured to determine interaction information to present to the user based on the interaction in which the user is interested;
- an executable portion configured to determine when the user is a member of an interaction network with the one or more product providers, wherein determining that the uses is the member of the interaction network comprises identifying that the user has a user resource pool with one of one or more of the organizations within the interaction network, wherein the one or more organizations are one or more financial institutions, and wherein the interaction network comprises users and product providers that all have resource pools with the one or more financial institutions;
- an executable portion configured to receive confirmation from the user or the product provider to enter into the interaction through the user computer system or the interaction terminal;
- an executable portion configured to identify resources to transfer associated with the interaction between the user resource pool and a product provider resource pool; and
- an executable portion configured to transfer the resources from the user resource pool to the product provider resource pool of the product provider directly between the user resource pool and the product provider resource pool when the user is the member, and indirectly along traditional processing rails outside of the interaction network when the user is identified as a non-member.

19. The computer program product of claim 18, wherein the interaction zone is established by the one or more interaction terminals at a location of the product provider.

* * * * *